(12) United States Patent
Shi et al.

(10) Patent No.: US 12,513,365 B2
(45) Date of Patent: Dec. 30, 2025

(54) METHOD FOR TRAINING CONTENT MODERATION MODEL, METHOD FOR MODERATING VIDEO CONTENT, COMPUTER DEVICE, AND STORAGE MEDIUM

(71) Applicant: BIGO TECHNOLOGY PTE. LTD., Singapore (SG)

(72) Inventors: Feng Shi, Guangzhou (CN); Zhenqiang Liu, Guangzhou (CN)

(73) Assignee: BIGO TECHNOLOGY PTE. LTD., Singapore (SG)

( * ) Notice: Subject to any disclaimer, the term of this patent is extended or adjusted under 35 U.S.C. 154(b) by 682 days.

(21) Appl. No.: 17/772,392

(22) PCT Filed: Aug. 6, 2020

(86) PCT No.: PCT/CN2020/107353
§ 371 (c)(1),
(2) Date: Apr. 27, 2022

(87) PCT Pub. No.: WO2021/082589
PCT Pub. Date: May 6, 2021

(65) Prior Publication Data
US 2022/0377421 A1    Nov. 24, 2022

(30) Foreign Application Priority Data

Oct. 31, 2019   (CN) .......................... 201911051711.0

(51) Int. Cl.
*H04N 21/466*   (2011.01)
*G06T 3/40*   (2024.01)
(Continued)

(52) U.S. Cl.
CPC ............. *H04N 21/466* (2013.01); *G06T 3/40* (2013.01); *G06V 10/22* (2022.01); *G06V 10/774* (2022.01);
(Continued)

(58) Field of Classification Search
CPC .... H04N 21/466; H04N 21/4542; G06T 3/40; G06V 10/22; G06V 10/774; G06V 10/82;
(Continued)

(56) References Cited

U.S. PATENT DOCUMENTS 10,962,939 B1 *  3/2021  Das ..................... G06F 16/3344
11,093,698 B2    8/2021  Liu et al.
(Continued)

FOREIGN PATENT DOCUMENTS

CN         101315663 A      12/2008
CN         103440494 A      12/2013
(Continued)

OTHER PUBLICATIONS

Behrad, Alierza et al., "Content-based obscene video recognition by combining 3D spatiotemporal and motion-based features", Eurasip Journal on Image and Video Processing, vol. 2012, No. 1, abstract, figure 1, sec. 3.2, 3.3; Dec. 1, 2012 (Year: 2012).*
(Continued)

*Primary Examiner* — Matthew C Bella
*Assistant Examiner* — Janice E. Vaz
(74) *Attorney, Agent, or Firm* — Kolitch Romano Dascenzo Gates LLC (57) ABSTRACT

Provided is a method for training a content moderation mode. The method includes extracting part of image data of a sample video file as sample image data; positioning a time point of the sample image data in the sample video file in the case that the sample image data contains offensive content; extracting salient image region data from the image data
(Continued)

around the time point; and training the content moderation model based on the image region data and the sample image data.

15 Claims, 6 Drawing Sheets

(51) Int. Cl.
  *G06V 10/22* (2022.01)
  *G06V 10/774* (2022.01)
  *G06V 10/82* (2022.01)
  *G06V 20/40* (2022.01)
  *H04N 21/454* (2011.01)
(52) U.S. Cl.
  CPC .............. *G06V 10/82* (2022.01); *G06V 20/41* (2022.01); *G06V 20/46* (2022.01); *G06V 20/49* (2022.01); *H04N 21/4542* (2013.01)
(58) Field of Classification Search
  CPC ........ G06V 20/41; G06V 20/46; G06V 20/49; G06F 18/214
  See application file for complete search history.

(56) References Cited

U.S. PATENT DOCUMENTS

| | | | | |
|---|---|---|---|---|
| 11,354,900 | B1* | 6/2022 | Li | G06V 10/56 |
| 2017/0289624 | A1 | 10/2017 | Avila et al. | |
| 2019/0012568 | A1 | 1/2019 | Kumar et al. | |
| 2020/0366959 | A1* | 11/2020 | Pau | H04N 21/45452 |

FOREIGN PATENT DOCUMENTS

| | | | | |
|---|---|---|---|---|
| CN | 103902954 | A | 7/2014 | |
| CN | 105844238 | A | 8/2016 | |
| CN | 105844239 | A | 8/2016 | |
| CN | 105930841 | A | 9/2016 | |
| CN | 106708949 | A | 5/2017 | |
| CN | 106778590 | A | 5/2017 | |
| CN | 107341505 | A | 11/2017 | |
| CN | 108121961 | A | 6/2018 | |
| CN | 108124191 | A | 6/2018 | |
| CN | 108419091 | A * | 8/2018 | G06N 20/00 |
| CN | 109151499 | A | 1/2019 | |
| CN | 109284784 | A | 1/2019 | |
| CN | 109409241 | A | 3/2019 | |
| CN | 109753975 | A | 5/2019 | |
| CN | 109862394 | A * | 6/2019 | |
| CN | 110276398 | A | 9/2019 | |
| CN | 110796098 | A | 2/2020 | |
| RU | 2446460 | C1 | 3/2012 | |
| RU | 2530671 | C1 | 10/2014 | |
| WO | 2017162919 | A1 | 9/2017 | |

OTHER PUBLICATIONS

Singh, Shubham et al., "KidsGUARD: Fine Grained Approach for Child Unsafe Video Representation and Detection", Applied Computing, ACM, 2, pp. 2104-2111, abstract, sec. 3.1, 3.2; Apr. 8, 2019 (Year: 2019).*

Behrad et al.: Content-based obscene video recognition by combining 3D spatiotemporal and motion-based features. Eurasip Journal on Image and Video Processing, 2012 (Year: 2012).*

Extended European Search Report Communication Pursuant to Rule 62 EPC, dated Oct. 24, 2022 in Patent Application No. EP 20881536.5, which is a foreign counterpart to this U.S. Application.

Behrad, Alierza et al., "Content-based obscene video recognition by combining 3D spatiotemporal and motion-based features", Eurasip Journal on Image and Video Processing, vol. 2012, No. 1, abstract, figure 1, sec. 3.2, 3.3; Dec. 1, 2012.

Choi, Byeongcheol et al., "Design and performance evaluation of temporal motion and color energy features for objectionable video classification", Advanced Information Management and Service (Ims), 2010 6th InternationalVonference on, IEEE, pp. 37-41, the whole document; Nov. 30, 2010.

Moreira, Daniel et al., "Multimodal data fusion for sensitive scene localization", Information Fusion, Elsevier, US, vol. 45, pp. 307-323, the whole document; Mar. 7, 2018.

Singh, Shubham et al., "KidsGUARD: Fine Grained Approach for Child Unsafe Video Representation and Detection", Applied Computing, ACM, 2 Penn Plaza, Suite 701New YorkNY10121-0701USA, pp. 2104-2111, abstract, sec. 3.1, 3.2; Apr. 8, 2019.

Yan, Jianqiang et al., "Pornographic video detection with MapReduce", International Journal of Machine Learning and Cybernetics, Springer Berlin Heidelberg, Berlin/ Heidelberg, vol. 9, No. 12, pp. 2105-2115, abstract, figures1, 2, sec. 2.1, 2.2, 2.4; May 26, 2017.

Yatawatte, Hasini et al., "Content Based Video Retrieval for Obscene Adult Content Detection", , SAT 2015 18th International Conference, Austin, TX, USA, Sep. 24-27, 2015; [Lecture Notes in Computer Science; Lect. Notes Computer], Springer, Berlin, Heidelberg, pp. 384-392, the whole document; Nov. 18, 2015.

Communication pursuant to Article 94(3) EPC of European application No. 20881536.5 issued on Nov. 21, 2022.

Russian Search Report, dated Nov. 15, 2022 in Patent Application No. 2022114373, which is a foreign counterpart to this U.S. Application.

International Search Report of the International Searching Authority for State Intellectual Property Office of the People's Republic of China in PCT application No. PCT/CN2020/107353 issued on Oct. 30, 2020, which is an international application corresponding to this U.S. application.

The State Intellectual Property Office of People's Republic of China, First Office Action in Patent Application No. CN201911051711.0 issued on Mar. 29, 2021, which is a foreign counterpart application corresponding to this U.S. Patent Application, to which this application claims priority.

Notification of Completion of Formalities for Patent Register and Notification to Grant Patent Right for Invention Application No. 201911051711.0 Issued on Jun. 30, 2021, to which this application claims priority.

* cited by examiner

METHOD FOR TRAINING CONTENT MODERATION MODEL, METHOD FOR MODERATING VIDEO CONTENT, COMPUTER DEVICE, AND STORAGE MEDIUM

CROSS-REFERENCE TO RELATED APPLICATION

This application is a US national stage of international application No. PCT/CN2020/107353, filed on Aug. 6, 2020, which claims priority to the Chinese patent application No. 201911051711.0, filed on Oct. 31, 2019, the contents of which are herein incorporated by references in their entireties.

TECHNICAL FIELD

The present disclosure relates to the field of video moderation technologies, and in particular, relates to a method for training a content moderation model, a method for moderating video content, and a computer device and a storage medium.

BACKGROUND

With the development of the Internet technology, the traffic of internet video increases dramatically in recent years, and a new user generated content (UGC), for example, a short video, a live streaming, and the like, causes the internet video to become increasingly rich.

In this case, a video of a large quantity of offensive content, for example, the video of terrorism, violence, pornography, gambling, and the like, is also generated and intended to propagate in the Internet.

Thus, before or after publishing of the video, the content of the video needs to be moderated, and the video with offensive content is filtered out.

In one approach, the video resource uploaded to the Internet is manually moderated to determine whether contains offensive content. However, as increase of the amount of the video resources on the Internet, manual moderation for the video content is time consuming and less efficient. Thus, the approach of moderating video content may be the approach of machine learning. In this approach, whether image data (image frame) in a training video is offensive and an offense category of the image data are first manually marked, and then the image data and corresponding offense category are input into a machine learning model for training, and the other video content is identified using the trained model.

SUMMARY

Embodiments of the present disclosure provide a method and apparatus for training a content moderation model, a method and apparatus for moderating video content, and a computer device and a storage medium thereof.

A method for training a content moderation model is provided. The method includes:
extracting part of image data of a sample video file as sample image data;
positioning a time point of the sample image data in the sample video file in the case that the sample image data contains offensive content;
extracting salient image region data from the image data around the time point; and
training the content moderation model based on the image region data and the sample image data.

A method for moderating video content is also provided. The method includes:
extracting part of image data of a target video file as target image data;
positioning a time point of the target image data in the target video file in the case that the target image data contains offensive content;
extracting salient image region data from the image data around the time point; and
moderating the content of the target video file by inputting the image region data and the sample image data into a preset content moderation model.

An apparatus for training a content moderation model is also provided. The method includes:
a sample image data extracting module, configured to extract part of image data of a sample video file as sample image data;
a time point positioning module, configured to position a time point of the sample image data in the sample video file in the case that the sample image data contains offensive content;
an image region data extracting module, configured to extract salient image region data from the image data around the time point; and
a model training module, configured to train the content moderation model based on the image region data and the sample image data.

An apparatus for moderating video content is also provided. The method includes:
a target image data extracting module, configured to extract part of image data of a target video file as target image data;
a time point positioning module, configured to position a time point the target image data in the target video file in the case that the target image data contains offensive content;
an image region data extracting module, configured to extract salient image region data from the image data around the time point; and
a video moderating module, configured to moderate the content of the target video file by inputting the image region data and the sample image data into a preset content moderation model.

A computer device is also provided. The computer device includes:
one or more processors;
a memory configured to store one or more programs;
wherein the one or more processors, when running the one or more programs, is caused to perform the method for training the content moderation model described above or the method for moderating the video content described above.

A computer readable storage medium is also provided. The computer readable storage medium stores a computer program, wherein the computer program, when run by a processor of a computer device, causes the computer device to perform the method for training the content moderation model described above or the method for moderating the video content described above.

DETAILED DESCRIPTION

The following describes the present disclosure hereinafter in connection with the accompanying drawings and the embodiments. Only some, but not all, of the structures associated with the present disclosure are shown in the accompanying drawings. The embodiments of the present disclosure and the features in the embodiments may be combined with each other. It shall be understood that, although the terms "first," "second," "third," and the like may be used herein to describe various information, the information should not be limited by these terms. These terms are only used to distinguish one category of information from another. The singular forms "a," "an," and "the" include both singular and plural referents unless the context clearly dictates otherwise.

First Embodiment

Figure 1:
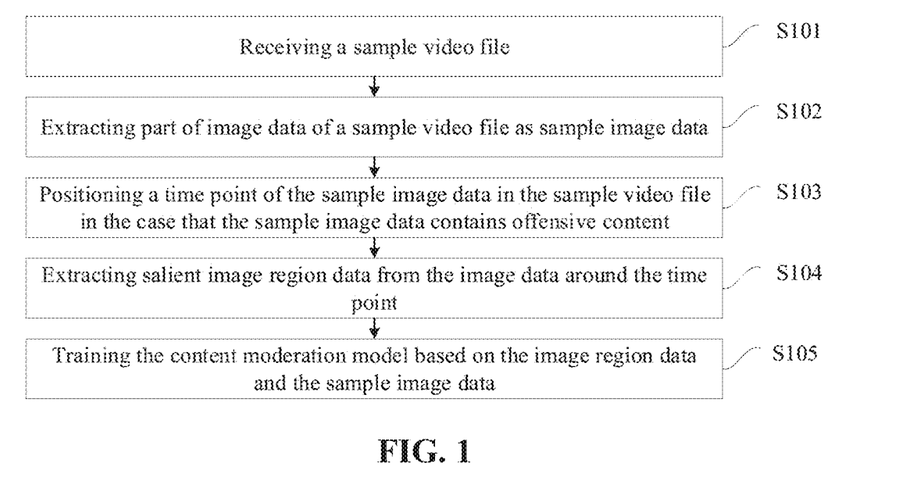
FIG. 1 is a flowchart of a method for training a content moderation model according to a first embodiment of the present disclosure.

FIG. 1 is a flowchart of a method for training a content moderation model according to a first embodiment of the present disclosure. This embodiment is applicable to cases where video data is marked automatically over time, space. The method may be performed by an apparatus for training a content moderation model, and the apparatus for training the content moderation model may be implemented over software and/or hardware, and may be configured in a computer device, e.g., a server, a workstation, a personal computer, or the like. The method includes the following processes.

In S101, a sample video file is received.

The sample video file, as a video, includes a plurality of frames of consecutive image data. In the case that the consecutive image data changes are greater than 24 frames per second, according to the visual persistence principle, human eyes cannot discern a single static image, and thus, a visual effect is smooth and consecutive.

In this embodiment, a video file may be acquired as a sample for training the content moderation model by grabbing the video file from the network, accumulating the video file uploaded by a user, downloading the video file from a published database, and the like in advance, and the sample for training the content moderation model is also referred to as the sample video file.

For different business scenarios, the formats and forms of the sample video file are different, which are not limited in this embodiment.

In an example, the format of the sample video file may include a Moving Picture Experts Group (MPEG), a Real Media Variable Bitrate (RMVB), an Audio Video Interleaved (AVI), a Flash Video (FLV), and the like.

The form of the sample video file may include a short video, a live streaming video, a movie, a television series, or the like.

In S102, part of image data of a sample video file is extracted as sample image data.

In this embodiment, part of image data may be selected from all of the image data of the sample video file as the sample image data.

In S103, a time point of the sample image data in the sample video file is positioned in the case that the sample image data contains offensive content.

In this embodiment, the content of the sample image data may be identified to determine whether the content is offensive content. The content of the sample image data may be determined as offensive content in the case that the content relates to terrorism, violence, pornography, gambling, and the like, and the content of the sample image data may be determined to be legal in the case that the content relates to a landscape, a building, or the like.

For the sample image data with offensive content, a time point of the sample image data in the sample video file may be positioned.

In S104, salient image region data is extracted from the image data around the time point.

Salience, as visual features of the image, represents the attention of human eyes on some regions of the image.

For a frame of image, the user is interested in a partial region of the image, and the interesting partial region represents the intent of the user. The majority of the remaining regions are independent of the intent of the user, that is, the salient region is a region in the image that is most likely to cause the interest of the user and represent the image content.

In fact, the selection of salience is subjective, and for the same frame image, different users may select different regions as salient regions due to different tasks and knowledge bases of the users.

The attention mechanism of the person is used to calculate the salience of the region. The study of cognitive psychology has shown that some regions in the image can significantly attract the attention of the person, and these regions include a larger amount of information. Therefore, the attention mechanism of the person can be simulated based on a mathematical model, and the extracted salient regions are more compliant with the subjective evaluation of the person as the general rule in the image cognitive process is utilized.

On the timeline of the sample video file, a plurality of frames of the image data are present around the time point of the sample image data. In this embodiment, the salient regions may be extracted from the image data as the image region data.

For the sample video file, the scene is generally not transformed within a short period of time. That is, the other image data around the sample image data is substantially the same as the content of the sample image data. In the case that the sample image data contains offensive content, it is highly probable that the image data content is offensive, and thus, the image data content is also considered to be offensive. Therefore, based on the sensitivity of the user to the offensive content related to terrorism, violence, pornography, gambling, and the like, the salient image region data in the image data is primarily focused on terrorism, violence, pornography, gambling, and the like.

In S105, the content moderation model is trained based on the image region data and the sample image data.

In this embodiment, the sample video file may be marked with an offense category of the offensive content in advance. By training over a preset network with a training sample of the image region data and the sample image data of different sample video files, and a tag of the offense category, the content moderation model is acquired in the case that the training is completed.

In an example, the network may include a machine model, for example, a support vector machine (SVM), a random forest, an Xgboost, and a neural network, for example, a convolutional neural network (CNN), a deep neural network (DNN), and a recurrent neural network (RNN), which is not limited in this embodiment.

In this embodiment, the DNN is illustrated as an example of the content moderation model.

In this embodiment, the offense category (for example, terrorism, violence, pornography, and the like) marked on the sample video file and representing the offensive content is determined.

The deep neural network and a pre-trained model are acquired. The pre-trained model is a deep learning architecture that has been trained to perform specific tasks (for example, identifying classification in a picture) with a large amount of data, and includes VGG, Inception, ResNet, MobileNet, NasNet, and the like.

The deep neural network is initialized using the pre-trained model. That is, by using the pre-trained model trained with a large dataset before use, the corresponding configuration and weight may be directly applied to the deep neural network to implement the migration learning.

By backpropagation, the deep neural network is trained as the content moderation model based on the image region data, the sample image data, and the offense category.

In an example, the image region data and the sample image data are input into the deep neural network, the original pixel information is fused by a non-linear mapping between neurons, and the scores of the different offense categories are acquired by a Softmax regression layer and act as the offense score. A classification loss of the entire deep neural network is acquired by calculating a cross-entropy of the offense score and the tag of the training sample.

In an example, where the sample video file belongs to different offense categories, the content moderation model may be configured to identify different offense categories. Where the sample video file belongs to the same offense category, the content moderation model may be configured to identify the offense category.

The method for training the content moderation model in this embodiment is illustrated by the following examples.

Figure 2:
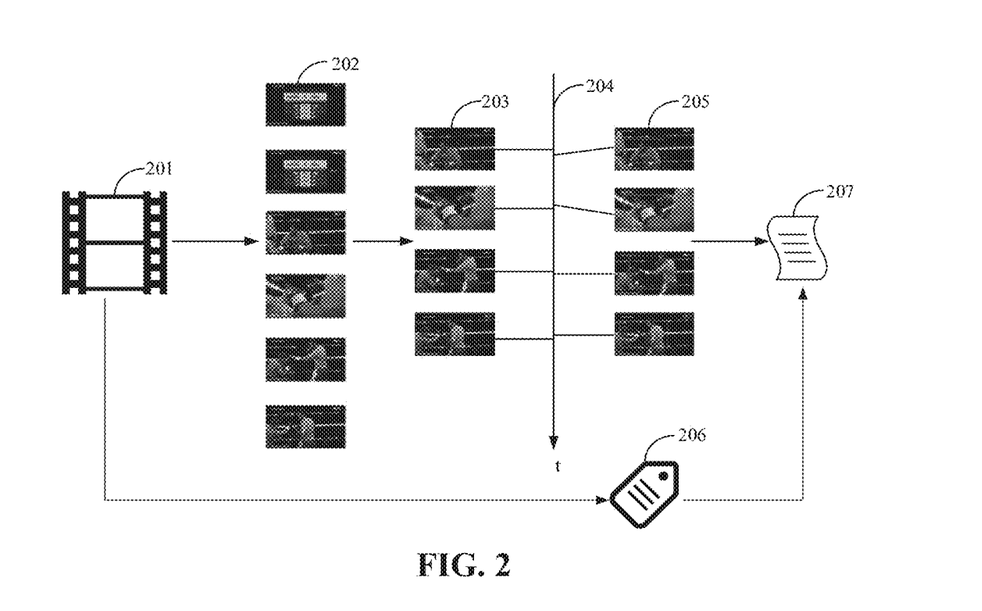
FIG. 2 is a schematic diagram of training a content moderation model according to the first embodiment of the present disclosure.

For example, as shown in FIG. 2, for a sample video file 201 with the content being a boxing match, six frames of image data are extracted from the sample video file as a sample image data 202, four frames of the image data 202 containing offensive content are determined as a sample image data 203, and the sample image data 203 containing offensive content involves violence. A time point of the sample image data 203 containing offensive content is positioned on the timeline 204 of the sample video file 201, salient image region data is extracted from the image data 205 around the time point (block portion). The content moderation model 207 is trained with a training sample of the salient image region data in the sample image data 202 and the image data 205, and a tag of the offense category 206 of the sample video file 201, such that the content moderation model 207 can be configured to classify the image data, and the dimension of the classification is consistent with the offense category 206.

In this embodiment, the sample video file is received. The sample video file includes a plurality of frames of the image data, part of the image data is extracted as the sample image data, and the time point of the sample image data in the sample video file is positioned in the case that the sample image data contains offensive content. The salient image region data is extracted from the image data around the time point, and the content moderation model is trained based on the image region data and the sample image data. The sample image data containing offensive content is positioned with respect to the time, and the salient image region data is positioned with respect to the space, thereby achieving spatiotemporal positioning of the sample video file, i.e., self-positioning of the offensive content of the sample video file in the time and space dimensions. Therefore, the feature of the offensive content can be quickly sampled from the sample video file for characterization, the quality of the feature is increased in the aspects of time and space for content moderation, and the performance of the content moderation model may be ensured by training the content moderation model in this manner. In addition, automatic tagging of the sample image data is achieved without adding annotation effort by positioning the sample image data and the image region data with the offensive content, which is easy for operation and eliminates the need for manually tagging, improves efficiency of training the content moderation model, and reduces the cost of training the content moderation model.

Second Embodiment

Figure 3:
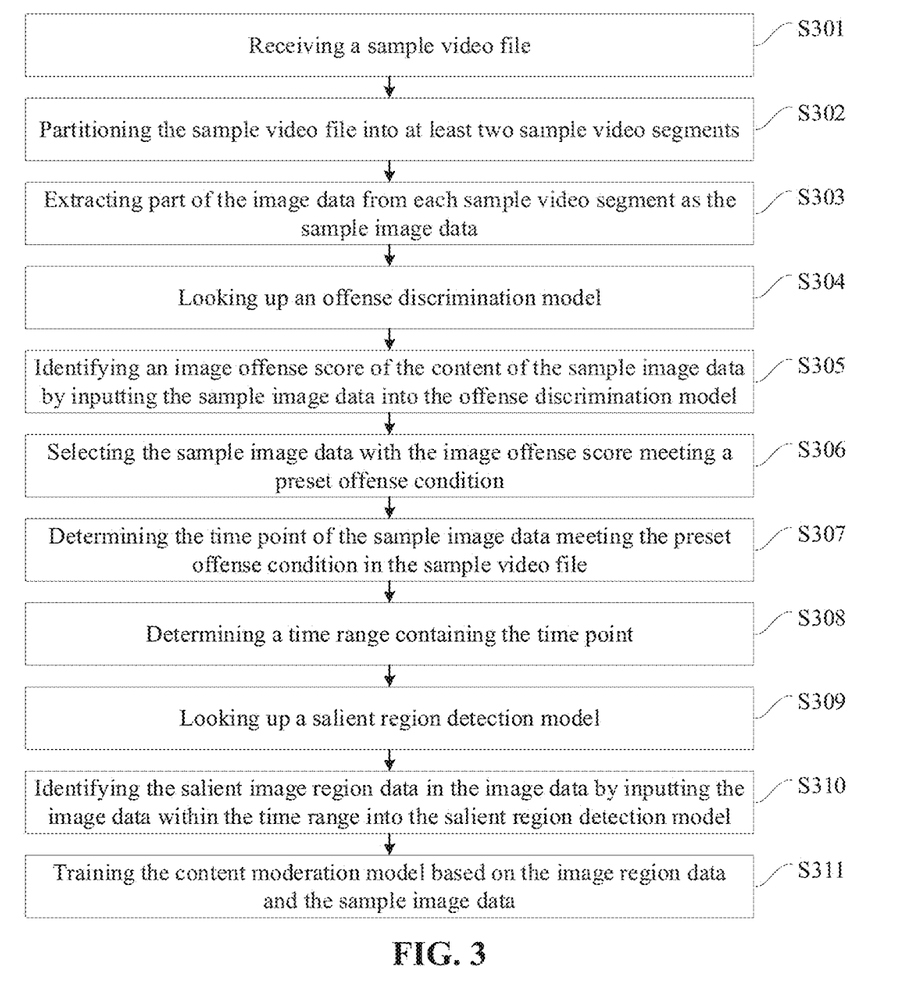
FIG. 3 is a flowchart of a method for training a content moderation model according to a second embodiment of the present disclosure.

FIG. 3 is a flowchart of a method for training a content moderation model according to a second embodiment of the present disclosure. This embodiment illustrates the operations of extracting sample image data, positioning time point, and extracting image region data based on above embodiment. The method includes the following processes.

In S301, a sample video file is received.

The sample video file includes a plurality of frames of image data.

In S302, the sample video file is partitioned into at least two sample video segments.

In S303, part of the image data is extracted from each sample video segment as the sample image data.

In an example, the sample video file may be segmented at a time interval, i.e., the sample video file is partitioned into at least two sample video segments.

From each sample video segment, n frames of the image data are extracted randomly as the sample image data, and thus a sequence of video frames to be processed is formed.

The parameters t and n are both adjustable parameters.

In an example, except for the average partition of sample video file and the random extraction of the image, the sample image data may be extracted in other manners according to the actual needs. For example, for the sample video file including barrages, the barrage may represent the interest of the user in the content of the sample video file to some extent, and the sample video file is partitioned with respect to the barrages, such that the density of the barrages in each sample video segment (the quantity within a unit time) is within a set range. Alternatively, the image data is extracted from each sample video segment, such that the time interval between every two frames of the image data is equal, and the like, which is not limited in this embodiment.

Additionally, the sample image data may be scaled to a preset size, and the sample image data may further be ranked in time order, thereby facilitating training of the content moderation model.

In S304, an offense discrimination model is looked up.

In this embodiment, the image data containing offensive content may be pre-used as the training sample, and a network (e.g., CNN) is trained with a tag of the offense category. In the case that the training is completed, the offense discrimination model can be acquired. That is, the offense discrimination model can be configured to identify an image offense score of the content in the image data.

Optionally, different offense discrimination models can be trained for different offense categories. That is, an offense discrimination model can be configured to identify an image offense score in the image data of which the content belongs to the same offense category.

Generally, the sample video file is consistent with the offense category of the sample image data. Therefore, the offense category marked on the sample video file and representing the offensive content may be determined, the offense discrimination model corresponding to the offense category is looked up, and the offense discrimination model is configured to identify the image offense score in the image data of which the content belongs to the offense category.

A generic offense discrimination model may also be trained for different offense categories, i.e., one offense discrimination model can be configured to identify the image offense score in the image data of which the content belongs to different offense category, which are not limited in this embodiment.

In S305, an image offense score of the content of the sample image data is identified by inputting the sample image data into the offense discrimination model.

In the case that the offense discrimination model is determined, the sample image data of the sample video file may be sequentially input into the offense discrimination model for processing, and the offense discrimination model outputs the image offense score of the sample image data sequentially.

In S306, the sample image data with the image offense score meeting a preset offense condition is selected.

In this embodiment, the offense condition may be preset, and the offense condition used to determine the sample image data containing offensive content.

In the case that the image offense score of the sample image data is determined, the sample image data with the image offense score meeting the offense condition is determined.

In an example, the offense condition is that the image offense score is greater than an image score threshold, or the value of the image offense score is greatest.

In this embodiment, the image offense score of the sample image data may be determined whether to be greater a preset image score threshold.

In the case that the image offense score of the sample image data is greater than the preset image score threshold, the image offense score is determined to meet the preset offense condition.

In the case that the image offense score of the sample image data is greater than the preset image score threshold, the image offense score is determined to meet the preset offense condition.

The above offense condition is merely an example, and when this embodiment is implemented, other offense condition may be set according to actual needs, for example, the top m of the value of the image offense score and the like, which is not limited in the embodiments of the present disclosure. In addition, other offense conditions, except for above offense condition, may be applied according to actual needs, which is not limited in the embodiments of the present disclosure.

In S307, the time point of the sample image data meeting the preset offense condition in the sample video file is determined.

In the case that a frame of sample image data is determined to meet the offense condition, the time point of the sample image data in the sample video file is determined.

In S308, a time range containing the time point is determined.

On the timeline of the sample video file, the time range containing the point is generated based on the time point.

In an example, assuming that the time point is T, then the time range of duration F[T−F/2, T+F/2] may be generated, wherein F is an adjustable parameter.

The manner of generating the time range described above is merely an example, and when this embodiment is implemented, other manners of generating the time range may be employed according to actual needs, for example, [T−F/3, T+2F/3], [T−3F/4, T+F/4], and the like, which is not limited in the embodiments of the present disclosure. In addition, except for the manner of generating the time range, other manners of generating the time range may be employed according to actual needs, which is not limited in the embodiments of the present disclosure.

In S309, a salient region detection model is looked up.

In this embodiment, the salient region detection model is also preset, and the salient region detection model can be configured to identify a salient image region in the image data.

In an example, the salient region detection model may be applied in three classes of algorithms as follows.

A first class is a salience analysis algorithm based on low-level vision feature, for example, a salience algorithm (Itti algorithm), which is a selective attention algorithm that simulates a visual attention mechanism of an organism, and is adapted to process natural images.

A second class is a complete mathematical calculation method that is not based on any biological visual principle, for example, a full-resolution algorithm (Aho-Corasick, AC algorithm), a spectral residual algorithm (SR algorithm) based on a spatial frequency domain.

A third class combines the above two classes of the algorithms, for example, a graph theory based algorithm (GBVS algorithm), which simulates the visual principle similar to the Itti algorithm in the feature extraction process, and introduces a Markov chain in the salient image generation process and acquires a salience value with a complete mathematical calculation method.

In S310, the salient image region data in the image data is identified by inputting the image data within the time range into the salient region detection model.

The image data within the time range is extracted from the sample video file, the image data is sequentially input into the salient region detection model for processing, and the salient region detection model outputs the salient image region data in the image data.

In S311, the content moderation model is trained based on the image region data and the sample image data.

In this embodiment, for the sample image data containing offensive content, the time range is determined based on the time point, and it is highly probable that the content of the image data within the time range is offensive. Thus, extracting the salient image region data may quickly expand the training sample with reliability, thereby improving the performance of the content moderation model by training the content moderation model.

Third Embodiment

Figure 4:
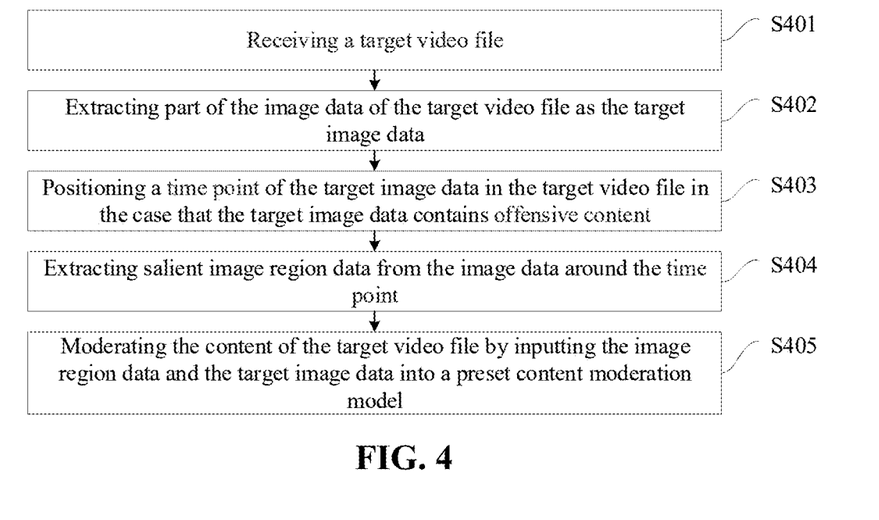
FIG. 4 is a flowchart of a method for moderating video content according to a third embodiment of the present disclosure.

FIG. 4 is a flowchart of a method for moderating video content according to a third embodiment of the present disclosure. This embodiment is applicable to the case where video data is moderated in time and space. The method may be performed by an apparatus for moderating video content, and the apparatus for training a content moderation model may be implemented over software and/or hardware and may be configured in a computer device, e.g., a server, a workstation, a personal computer, and the like. The method includes the following processes.

In S401, a target video file is received.

The target video file, as a video, includes a plurality of frames of consecutive image data. In the case that the consecutive image data changes are greater than 24 frames per second, according to the visual persistence principle, human eyes cannot discern a single static image, and thus, a visual effect is smooth and consecutive.

For different business scenarios, the formats and forms of the target video file are different, which are not limited in this embodiment.

The format of the target video file may include MPEG, RMVB, AVI, FLV, and the like.

The form of the target video file may include a short video, a live streaming video, a movie, a television series, or the like.

The user uploads the target video file to the computer device, and is intended to publish the target video file to allow the public to review and browse.

The computer device may develop moderation criteria according to business, legality, and other factors. Prior to publishing the target video file, the content of the target video file is moderated based on the moderation criteria, some target video files that do not comply with the review criteria are filtered out (for example, the content of the target video file involving terrorism, violence, pornography, gambling, and the like), and some target video files that comply with the moderation criteria are published.

For the target video file with a higher requirement for timeliness, for example, short video, live streaming video, and the like, a streaming real-time system may be provided. The user uploads the target video file to the streaming real-time system over a client, and the streaming real-time system may transfer the target video file to the computer device for moderation.

For the target video file with a lower requirement for timeliness, for example, movies, television series, and the like, a database may be provided, for example, a distributed database and the like. The user uploads the computer device to the database through the client, and the computer device may read the target video file from the database for moderation.

In S402, part of the image data of the target video file is extracted as the target image data.

In this embodiment, part of the image data may be selected from all image data of the target video file as the target image data.

In S403, a time point of the target image data in the target video file is positioned in the case that the target image data contains offensive content.

In this embodiment, the content of the target image data may be identified to determine whether the content of the target image data is offensive content. The content of the target image data may be determined as offensive content in the case that the content relates to terrorism, violence, pornography, gambling, and the like, and the content of the target image data may be determined to be legal in the case that the content relates to a landscape, a building, or the like.

For the target image data containing offensive content, a time point of the target image data in the target video file may be positioned.

S404, salient image region data is extracted from the image data around the time point.

Salience, as visual features of the image, represents the attention of human eyes on some regions of the image.

For a frame of image, the user is interested in a partial region of the image, and the interesting partial region represents the intent of the user. The majority of the remaining regions are independent of the intent of the user, that is, the salient region is a region in the image that is most likely to cause the interest of the user and represent the image content.

In fact, the selection of salience is subjective, and for the same frame image, different users may select different regions as salient regions due to different tasks and knowledge bases of the users.

The attention mechanism of the person is used to calculate the salience of the region. The study of cognitive psychology has shown that some regions in the image can significantly attract the attention of the person, and these regions include a larger amount of information. Therefore, the attention mechanism of the person can be simulated based on a mathematical model, and the extracted salient regions are more complied with the subjective evaluation of the person as the general rule in the image cognitive process is utilized.

On the timeline of the target video file, a plurality of frames of the image data are present around the time point of the target image data. In this embodiment, the salient regions may be extracted from the image data as the image region data.

For the target video file, the scene is generally not transformed within a short period of time. That is, the other image data around the target image data is substantially the same as the content of the target image data. In the case that the target image data contains offensive content, it is highly probable that the image data content is offensive, and thus, the image data content is also considered as offensive content. Therefore, based on the sensitivity of the user to the offensive data related to terrorism, violence, pornography, gambling, and the like, the salient image region data in the image data is primarily focused on terrorism, violence, pornography, gambling, and offensive content.

In S405, the content of the target video file is moderated by inputting the image region data and the target image data into a preset content moderation model.

In this embodiment, the content moderation model may be pre-trained, and the content moderation model may be configured to identify a file offense score in the case that the content of the target video file belongs to a preset offense category.

As the training manner of the content moderation model is substantially similar to the application of the first embodiment, the second embodiment described above, the description is briefly, and the reference may be made for parts of description of the first embodiment, the second embodiment, which is not described in this embodiment herein.

For the target video file, the image region data and the target image data may be input into the content moderation model for processing, and the content of the target video file may be moderated based on the result output from the content moderation model to determine whether the content is offensive content.

In an example, the image region data and the target image data are input into a preset content moderation model to determine the file offense score in the case that the content of the target video file belongs to the preset offense category.

A file score threshold is determined.

The file offense score is compared with the file score threshold.

In the case that the file offense score is less than or equal to the file score threshold, it is less probable that the target video file content is offensive, and the content of the target video file may be determined to be legal.

In the case that the file offense score is greater than the file score threshold, it is highly probable that the target video file content is offensive, and the target video file may be distributed to a designated client as a moderation task. The client is managed by a specialized moderator.

In the case that the client receives the moderation task, the moderator may browse the corresponding target video file to manually determine whether the content of the target video file is offensive.

The content of the target video file is determined to be legal in the case that first moderation information is received from the client.

The content of the target video file is determined to be offensive in the case that second moderation information is received from the client.

In a manner of determining the file score threshold, a total quantity of the target video files with a previous time period (e.g., a previous day) is determined, and the file offense score of the target video file has been determined.

The file score threshold is generated, such that a ratio of a moderation quantity to the total quantity matches a preset push ratio (suspected illegal push ratio, SIPR), wherein the moderation quantity is a quantity of the target video files of which the file offense scores are greater than the file score threshold.

Generally, the ratio of the quantity of target video files with the offensive content to the quantity of all target video files is relatively low, for example, 1%. In this determination manner, a push ratio higher than the ratio of 1% (for example, 10%) may be set to ensure that more target video file containing offensive content can be moderated manually as possible.

Assuming that the quantity of all target video files within the previous time period is 100,000, and the push ratio is 10%, then the target video file may be ranked based on the file offense score (from small to large), and the file offense score of the $10000^{th}$ target video file is set as the score threshold.

The above manner of determining the file score threshold is merely an example, and when this embodiment is implemented, other manner of determining the file score threshold may be set according to actual needs, for example, setting a default value as the file score threshold, and the like, which is not limited in the embodiments of the present disclosure. In addition, other manner of determining the file score threshold, except for above manner of determining the file score threshold, may be applied according to actual needs, which is not limited in the embodiments of the present disclosure.

The method for moderating the video content in this embodiment is illustrated by the following embodiments.

Figure 5:
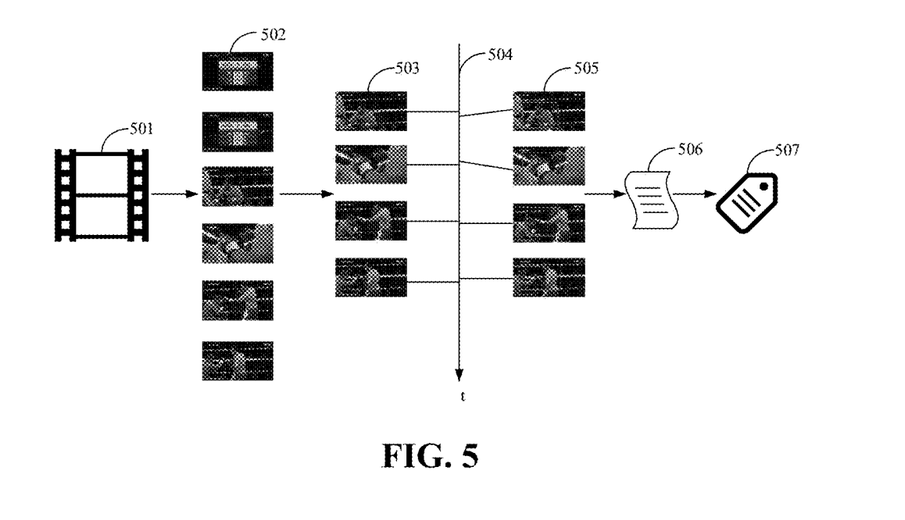
FIG. 5 is a schematic diagram of moderating a video content according to the third embodiment of the present disclosure.

For example, as shown in FIG. 5, for a sample video file 501 with the content being a boxing match, six frames of image data are extracted from the sample video file as a target image data 502, four frames of the image data 502 containing offensive content is determined as a target image data 503, and the target image data 503 containing offensive content involves violence. A time point of the target image data 503 containing offensive content is positioned on the timeline 504 of the target video file 501, salient image region data is extracted from the image data 505 around the time point (block portion). The salient image region data in the target image data 502 and the image data 505 are input into the content moderation model 506, and a tag 507, i.e., a legal or offensive class, of the target video file 501 is identified based on the result output by the content moderation model 506.

In this embodiment, the target video file is received. The target video file includes a plurality of frames of the image data, part of the image data is extracted as the target image data, and the time point of the target image data in the target video file is positioned in the case that the target image data contains offensive content. The salient image region data is extracted from the image data around the time point, and the image region data and the target image data are input into a preset content moderation model to moderate the content of the target video file. The target image data containing offensive content is positioned in time, and the salient image region data is positioned on space, thereby achieving spatiotemporal positioning of the target video file, i.e., self-positioning of the offense data of the target video file in time and space dimensions. Therefore, the feature of the offensive content is quickly sampled from the sample video file for characterization, and the quality of the feature is increased in the aspects of time and space for content moderation, thereby ensuring the quality of the content moderation, reducing the rate of mis-moderation, and improving the efficiency of moderating the video content.

Fourth Embodiment

Figure 6:
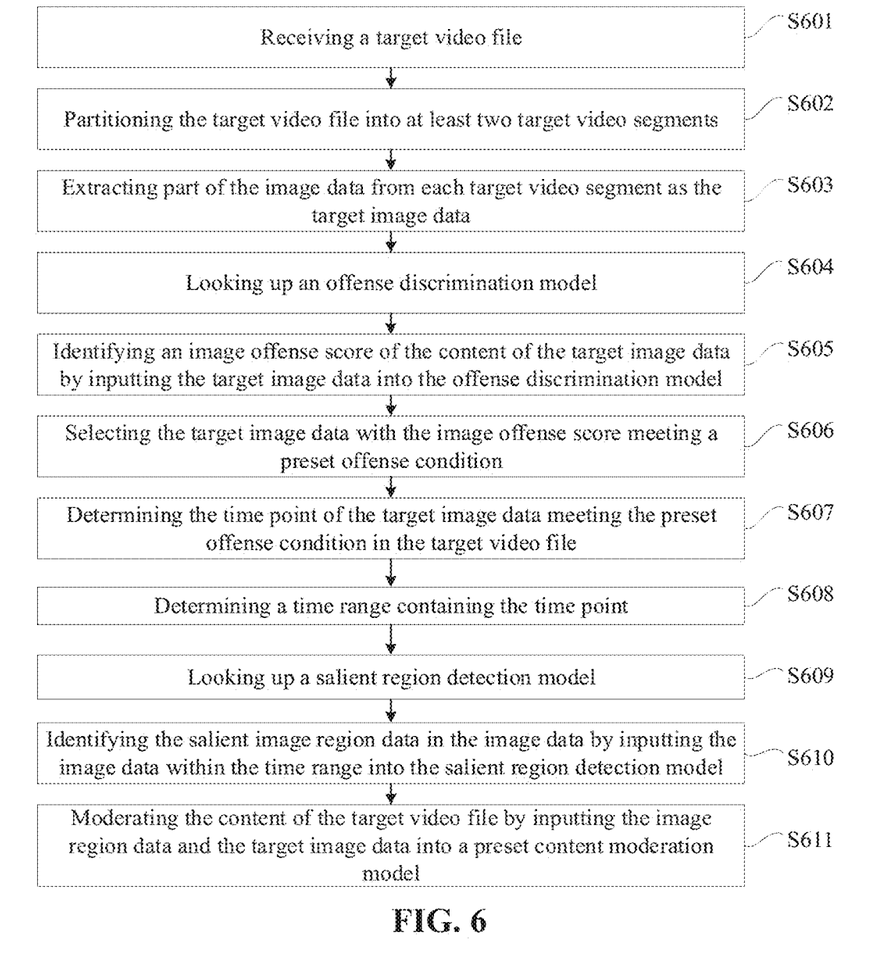
FIG. 6 is a flowchart of a method for moderating video content according to a fourth embodiment of the present disclosure.

FIG. 6 is a flowchart of a method for moderating video content according to a fourth embodiment of the present disclosure, and this embodiment illustrates the operations of extracting target image data, positioning time point, and extracting image region data based on above embodiments. The method includes the following processes.

In S601, a target video file is received.

The target video file includes a plurality of frames of image data.

In S602, the target video file is partitioned into at least two target video segments.

In S603, part of the image data is extracted from each target video segment as the target image data.

In an example, the target video file may be segmented at a time interval, i.e., the target video file is partitioned into at least two target video segments.

From each target video segment, n frames of the image data are extracted randomly as the target image data, and thus a sequence of video frames to be processed is formed.

The parameters t and n are both adjustable parameters.

Except for the average partition of target video file and the random extraction of the image, the target image data may be extracted in other manners according to the actual needs. For example, when the target video file is partitioned, the duration of the target video segments at both ends is longer, the duration of the middle target video segment is shorter. Alternatively, the image data is extracted from each target video segment, such that the time interval between every two frames of the image data is equal, and the like, which is not limited in this embodiment.

Additionally, the target image data may be scaled to a preset size, and the target image data may further be ranked in time order, thereby facilitating identifying of the content moderation model.

In S604, an offense discrimination model is looked up.

In this embodiment, the image data containing offensive content may be pre-used as the training sample, and a network (e.g., CNN) is trained with a tag of the offense category. In the case that the training is completed, the offense discrimination model can be acquired. That is, the offense discrimination model can be configured to identify an image offense score of the content in the image data.

Optionally, different offense discrimination models may be trained for different offense categories. That is, an offense discrimination model can be configured to identify an image offense score in the image data of which the content belongs to the same offense category.

A generic offense discrimination model may also be trained for different offense categories, i.e., one offense discrimination model can be configured to identify the image offense score in the image data of which the content belongs to different offense category, which are not limited in this embodiment.

In S605, an image offense score of the content of the target image data is identified by inputting the target image data into the offense discrimination model.

In the case that the offense discrimination model is determined, the target image data of the target video file may be sequentially input into the offense discrimination model for processing, and the offense discrimination model outputs the image offense score of the target image data sequentially.

In S606, the target image data with the image offense score meeting a preset offense condition is selected.

In this embodiment, the offense condition may be preset, and the offense condition used to determine the target image data containing offensive content.

In the case that the image offense score of the target image data is determined, the target image data with the image offense score meeting the offense condition is determined.

In an example, the offense condition is that the image offense score is greater than an image score threshold, or the value of the image offense score is greatest.

In this embodiment, the image offense score of the target image data may be determined whether to be greater a preset image score threshold.

In the case that the image offense score of the target image data is greater than the preset image score threshold, the image offense score is determined to meet the preset offense condition.

In the case that the image offense score of the target image data is greater than the preset image score threshold, the image offense score is determined to meet the preset offense condition.

The above offense condition is merely an example, and when this embodiment is implemented, other offense condition may be set according to actual needs, for example, the top m of the value of the image offense score, and the like, which is not limited in the embodiments of the present disclosure. In addition, other offense condition, except for above offense condition, may be applied according to actual needs, which is not limited in the embodiments of the present disclosure.

In S607, the time point of the target image data meeting the preset offense condition in the target video file is determined.

In the case that a frame of target image data is determined to meet the offense condition, the time point of the target image data in the target video file is determined.

In S608, a time range containing the time point is determined.

On the timeline of the target video file, the time range containing the point is generated based on the time point.

In an example, assuming that the time point is T, then the time range of duration F[T−F/2, T+F/2] may be generated, wherein F is an adjustable parameter.

The manner of generating the time range described above is merely an example, and when this embodiment is implemented, other manner of generating the time range may be set according to actual needs, for example, [T−F/3, T+2F/3], [T−3F/4, T+F/4], and the like, which is not limited in the embodiments of the present disclosure. In addition, except for the manner of generating the time range, other manner of generating the time range may be applied according to actual needs, which is not limited in the embodiments of the present disclosure.

In S609, a salient region detection model is looked up.

In this embodiment, the salient region detection model is also preset, and the salient region detection model may be configured to identify a salient image region in the image data.

In an example, the salient region detection model may be applied in three classes of algorithms as follows.

A first class is a salience analysis algorithm based on low-level vision feature, for example, a salience algorithm (Itti algorithm), which is a selective attention algorithm that simulates a visual attention mechanism of an organism, and is adapted to process natural images.

A second class is a complete mathematical calculation method that is not based on any biological visual principle, for example, a full-resolution algorithm (Aho-Corasick, AC algorithm), a spectral residual algorithm (SR algorithm) based on a spatial frequency domain.

A third class combines the above two classes of the algorithms, for example, a graph theory based algorithm (GBVS algorithm), which simulates the visual principle similar to the Itti algorithm in the feature extraction process, and introduces a Markov chain in the salient image generation process and acquires a salience value with a complete mathematical calculation method.

In S610, the salient image region data in the image data is identified by inputting the image data within the time range into the salient region detection model.

The image data within the time range is extracted from the target video file, the image data is sequentially input into the salient region detection model for processing, and the salient region detection model outputs the salient image region data in the image data.

In S611, the content of the target video file is moderated by inputting the image region data and the target image data into a preset content moderation model.

In this embodiment, for the target image data containing offensive content, the time range is determined based on the time point, and it is highly probable that the content of the image data within the time range is offensive. Thus, extracting the salient image region data may quickly expand the training sample with reliability, thereby improving the performance of the content moderation model by training the content moderation model.

Fifth Embodiment

Figure 7:
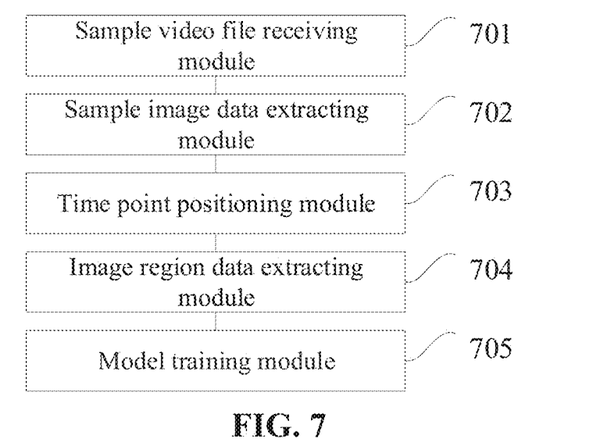
FIG. 7 is a schematic structural diagram of an apparatus for training a content moderation model according to a fifth embodiment of the present disclosure.

FIG. 7 is a schematic structural diagram of an apparatus for training a content moderation model according to a fifth embodiment of the present disclosure. The apparatus includes:
- a sample video file receiving module 701, configured to receive a sample video file, wherein the sample video file includes a plurality of frames of image data;
- a sample image data extracting module 702, configured to extract part of image data of a sample video file as sample image data;
- a time point positioning module 703, configured to position a time point of the sample image data in the sample video file in the case that the sample image data contains offensive content;
- an image region data extracting module 704, configured to extract salient image region data from the image data around the time point; and
- a model training module 705, configured to train the content moderation model based on the image region data and the sample image data.

The apparatus for training the content moderation model according to the embodiments of the present disclosure may perform the method for training the content moderation model according to any of the embodiments of the present disclosure, and has the functional modules and benefits corresponding to the method.

Sixth Embodiment

Figure 8:
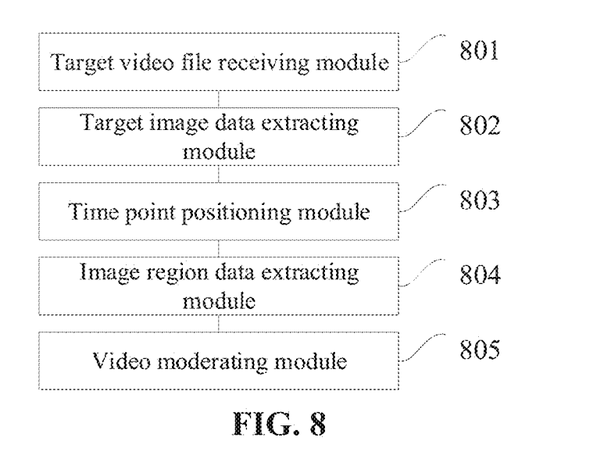
FIG. 8 is a schematic structural diagram of an apparatus for moderating video content according to a sixth embodiment of the present disclosure.

FIG. 8 is a schematic structural diagram of an apparatus for moderating video content according a sixth embodiment of the present disclosure. The apparatus includes:
- a target video file receiving module 801, configured to receive a target video file, wherein the target video file includes a plurality of frames of image data;
- a target image data extracting module 802, configured to extract part of image data of a target video file as target image data;
- a time point positioning module 803, configured to position a time point of the target image data in the target video file in the case that the target image data contains offensive content;
- an image region data extracting module 804, configured to extract salient image region data from the image data around the time point; and
- a video moderating module 805, configured to moderate the content of the target video file by inputting the image region data and the target image data into a preset content moderation model.

The apparatus for moderating video content according to the embodiments of the present invention may perform the method for moderating the video content according to any of the embodiments of the present disclosure, and has the functional modules and benefits corresponding to the method.

Seventh Embodiment

Figure 9:
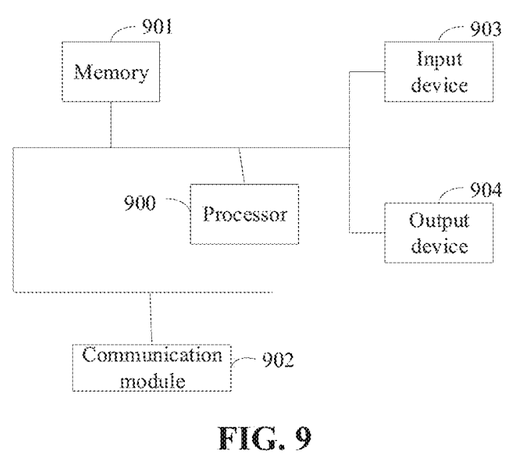
FIG. 9 is a schematic structural diagram of a computer device according to a seventh embodiment of the present disclosure.

FIG. 9 is a schematic structural diagram of a computer device according to a seventh embodiment of the present disclosure. As shown in FIG. 9, the computer device includes a processor 900, a memory 901, a communication module 902, an input device 903, and an output device 904. A quantity of the processors 900 in the computer device may be one or more, one processor 900 is taken as an example in FIG. 9. The processor 900, the memory 901, the communication module 902, the input device 903, and the output device 904 in the computer device may be connected by a bus or other means, and the bus is taken as an example in FIG. 9.

The computer device according to this embodiment may perform the method for training the content moderation model or the method for moderating the video content according to any of the embodiments of the present disclosure, and has the functional modules and benefits corresponding to the method.

Eighth Embodiment

This embodiment provides a computer-readable storage medium storing a computer program. The computer program, when run by a processor of a computer device, causes the computer device to perform the method for training the content moderation model or the method for moderating the video content.

The method for training the content moderation model includes:
- receiving a sample video file, wherein the sample video file includes a plurality of frames of image data;
- extracting part of image data as sample image data
- positioning a time point of the sample image data in the sample video file in the case that the sample image data contains offensive content;
- extracting salient image region data from the image data around the time point; and
- training the content moderation model based on the image region data and the sample image data.

The method for moderating the video content includes:
- receiving a target video file, wherein the target video file includes a plurality of frames of image data;
- extracting part of image data as target image data;
- positioning a time point of the target image data in the target video file in the case that the target image data contains offensive content;
- extracting salient image region data from the image data around the time point; and
- moderating the content of the target video file by inputting the image region data and the target image data into a preset content moderation model.

For the computer readable storage medium according to the embodiment of the present disclosure, the computer program is not limited to the operation method described above, and may also perform related operations in the method for training the content moderation model or the method for moderating the video content according to any of the embodiments of the present disclosure.

Based on the above description of the embodiments, the present disclosure may be implemented through software and the necessary generic hardware, or may be implemented through hardware. The technical solutions of the present disclosure may be embodied in the form of a software product, and the software product may be stored in the computer-readable storage medium, for example, a floppy disk of a computer, a read-only memory (ROM), a random-access memory (RAM), a FLASH memory, a hard disk, an optical disk, and the like. The computer-readable storage medium includes various instructions to cause the computer device (may be a personal computer, a server, or a network device, and the like) to perform the methods described in various embodiments of the present disclosure.

In the above embodiment of the apparatus for training the content moderation model and the apparatus for moderating video content, the included units and modules are merely divided according to function logic, but are not limited to the division described above, so long as the corresponding functions can be implemented. In addition, the names of the functional units are also merely for distinction, and are not intended to limit the scope of the present disclosure.

What is claimed is:

1. A method for training a content moderation model, comprising:
    extracting part of image data of a sample video file as sample image data;
    positioning a time point of the sample image data on a timeline of the sample video file in response to a determination that the sample image data contains offensive content;
    extracting salient image region data from the image data around the time point; and
    training the content moderation model based on the image region data and the sample image data;
    wherein extracting the salient image region data from the image data around the time point comprises:
    determining a time range containing the time point;
    looking up a salient region detection model configured to identify a salient image region in the image data; and
    identifying the salient image region data in the image data by inputting the image data within the time range into the salient region detection model.

2. The method according to claim 1, wherein extracting part of image data of the sample video file as the sample image data comprises:
    partitioning the sample video file into at least two sample video segments; and
    extracting part of the image data from each sample video segment as the sample image data.

3. The method according to claim 2, wherein extracting part of image data of the sample video file as the sample image data comprises at least one of:
    chronologically ranking the sample image data; and
    scaling the sample image data to a preset size.

4. The method according to claim 1, wherein positioning the time point of the sample image data on the timeline of the sample video file in response to the determination that the sample image data contains the offensive content comprises:
    looking up an offense discrimination model configured to identify an image offense score of the content in the image data;
    identifying the image offense score of content in the sample image data by inputting the sample image data into the offense discrimination model;
    selecting the sample image data with the image offense score meeting a preset offense condition; and
    determining the time point of the sample image data meeting the preset offense condition in the sample video file.

5. The method according to claim 4, wherein looking up the offense discrimination model comprises:

determining an offense category marked on the sample video file and representing the offensive content; and
looking up the offense discrimination model corresponding to the offense category, wherein the offense discrimination model is configured to identify the image offense score of the content that belongs to the offense category in the image data.

6. The method according to claim 4, wherein selecting the sample image data with the image offense score meeting the preset offense condition comprises:
    determining, whether the sample image data comprises the image offense score that is greater than a preset image score threshold;
    determining that the image offense score meets the preset offense condition in the case that the sample image data comprises the image offense score that is greater than the preset image score threshold; and
    determining that the image offense score of a maximum value meets a preset violation condition in the case that the sample image data does not comprise the image offense score that is greater than the preset image score threshold.

7. The method according to claim 1, wherein training the content moderation model based on the image region data and the sample image data comprises:
    determining an offense category marked on the sample video file and representing the offensive content;
    acquiring a deep neural network and a pre-trained model;
    initializing the deep neural network by the pre-trained model;
    training, by backpropagation, the deep neural network as the content moderation model based on the image region data, the sample image data, and the offense category.

8. A method for moderating video content, comprising:
    extracting part of image data of a target video file as target image data;
    positioning a time point of the target image data on a timeline of the target video file in response to a determination that the target image data contains offensive content;
    extracting salient image region data from the image data around the time point; and
    moderating content of the target video file by inputting the image region data and the target image data into a preset content moderation model;
    wherein extracting the salient image region data from the image data around the time point comprises:
    determining a time range containing the time point;
    looking up a salient region detection model configured to identify a salient image region in the image data; and
    identifying the salient image region data in the image data by inputting the image data within the time range into the salient region detection model.

9. The method according to claim 8, wherein inputting the image region data and the target image data into the preset content moderation model to moderate the content of the target video file comprises:
    determining a file offense score of the content of the target video file by inputting the image region data and the target image data into the preset content moderation model in the case that the content of the target video file belongs to a preset offense category;
    determining a file score threshold;
    determining the content of the target video file to be legal in the case that the file offense score is less than or equal to the file score threshold.

10. The method according to claim 9, wherein moderating the content of the target video file by inputting the image region data and the target image data into the preset content moderation model further comprises:
- distributing the target video file to a designated client in the case that the file offense score is greater than the file score threshold;
- determining the content of the target video file to be legal in the case that first moderation information is received from the client; and
- determining the content of the target video file to be offensive in the case that second moderation information is received from the client.

11. The method according to claim 9, wherein determining the file score threshold comprises:
- determining a total quantity of target video files with a previous time period, wherein the file offense score of the target video file has been determined;
- generating the file score threshold, such that a ratio of a moderation quantity to the total quantity matches a preset push ratio, wherein the moderation quantity is a quantity of the target video files of which file offense scores are greater than the file score threshold.

12. A computer device for training content moderation model, comprising:
- one or more processors;
- a memory configured to store one or more programs;
- wherein the one or more processors, when running the one or more programs, is caused to perform the method for training the content moderation model as defined in claim 1.

13. A non-volatile computer readable storage medium, storing a computer program, wherein the computer program, when run by a processor of a computer device, causes the computer device to perform the method for training the content moderation model as defined in claim 1.

14. A computer device for moderating video content, comprising:
- one or more processors;
- a memory configured to store one or more programs;
- wherein the one or more processors, when running the one or more programs, is caused to perform the method for moderating the video content as defined in claim 8.

15. A non-volatile computer readable storage medium, storing a computer program, wherein the computer program, when run by a processor of a computer device, causes the computer device to perform the method for moderating the video content as defined in claim 8.

* * * * *